United States Patent [19]

McIntyre, Jr.

[11] 4,016,321
[45] Apr. 5, 1977

[54] PRINTER RIBBON SUBSTRATES

[75] Inventor: William Ernest McIntyre, Jr., Circleville, Ohio

[73] Assignee: E. I. Du Pont de Nemours and Company, Wilmington, Del.

[22] Filed: Jan. 23, 1975

[21] Appl. No.: 543,449

[52] U.S. Cl. .............................. 428/216; 428/213; 428/215; 428/336; 428/337; 428/335; 428/474; 428/480; 428/910; 197/172

[51] Int. Cl.² .................. B41J 31/12; B32B 7/02; B32B 27/34

[58] Field of Search .......... 161/402, 227, 231, 164; 428/910, 480, 474, 409, 336, 215, 337, 335, 213, 216; 197/172; 117/36.1

[56] References Cited

UNITED STATES PATENTS

| 2,765,251 | 10/1956 | Williams | 161/227 |
|---|---|---|---|
| 3,165,499 | 1/1965 | Alles | 161/402 |
| 3,322,613 | 5/1967 | Rasmussen | 161/252 |
| 3,585,059 | 6/1971 | James | 161/227 |
| 3,682,764 | 8/1972 | Findlay | 161/255 |
| 3,686,069 | 8/1972 | Winkler | 161/227 |
| 3,794,547 | 2/1974 | Kuga | 161/402 |
| 3,840,427 | 10/1974 | Brazier | 161/227 |
| 3,840,497 | 10/1974 | Gondorchin | 156/331 |

FOREIGN PATENTS OR APPLICATIONS

| 2,176,391 | 10/1973 | France |
| 1,003,704 | 9/1965 | United Kingdom |

OTHER PUBLICATIONS

T888,001, July 1971, Drake 156/306.

*Primary Examiner*—Marion E. McCamish
*Assistant Examiner*—Ellis P. Robinson

[57] ABSTRACT

An improvement in a composite film substrate suitable for use as an ink carrying ribbon in printing machines. An asymmetrically biaxially oriented, heat set polymeric linear terephthalate ester base film has laminated to one surface thereof a nylon film backing in which the nylon film surface to steel static coefficient of friction is less than about 0.4.

1 Claim, 1 Drawing Figure

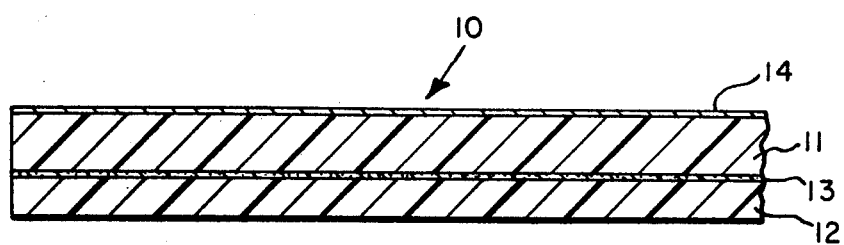

PRINTER RIBBON SUBSTRATES

BACKGROUND OF THE INVENTION

This invention relates to film structures and, more particularly, to an improvement in composite film substrates particularly suited for use as ink bearing ribbons in computer printers.

It is known in the film art to use polymeric films as base materials for carbon paper and ribbons such as typewriter ribbons. U.S. Pat. No. 3,682,764 to Findley et al., for example, teaches the preparation of a high impact ribbon having improved cut resistance. The ribbon comprises a transfer layer of a porous resin matrix containing expressible ink with a polymer film backing layer bonded to the back surface thereof by an elastomeric adhesive polymer. British Pat. No. 1,003,704 to Du Pont discloses a means for reducing excessive embossing in a polyethylene terephthalate (PET) typewriter ribbon by asymmetrical orientation of the film base. Other types of ribbons particularly suited for use in typewriters are the subject of Italian Patent Ser. No. 21734 A/72 to Sala et al. Disclosed therein is a ribbon comprising an ink-bearing polyester film base having a nylon film backing adhesively bonded thereto for improved service life.

The prior art addresses problems that are inherent in applying film technology to the preparation of ribbons suitable for use in standard typewriters. Other, more subtle problems emerge when this basic technology is applied to preparing ink-carrying ribbons suitable for high speed computer printers. In such applications it may be desirable to print characters at rates in excess of about 144,000 characters per minute (1200 lines per minute, 120 characters per line). In some types of printers more than one line, and as many as six lines, of characters can be printed simultaneously which requires a ribbon that may be 10 to 14 inches wide and capable of enduring up to about 200,000 lines of printing or more.

It has been recognized that film base typewriter ribbons, particularly those of ink-bearing polyester film with a nylon film backing, may frequently bind or stall in the ribbon handling and guiding mechanisms of high speed computer printers of the type hereinabove described. The tendency of these ribbons to bind or stall in their route from one reel to another can cause early ribbon failures from tearing or from damage caused by excessive type overwrites prior to normal ink exhaustion. Not only is great expense incurred because replacement ribbons must be kept readily available, but also because of computer use time that is lost when a printer is out of service.

SUMMARY OF THE INVENTION

It has been discovered that the major cause for failures in ribbons of polyester film backed with nylon film used in high speed printers is the relatively high friction associated with the use of ordinary nylon as a backing which causes an inordinate amount of binding or stalling as it is struck by type at high speeds.

Accordingly, there is provided by the present invention an improvement in a composite film base ribbon suitable for use as an ink carrying ribbon in a printing machine comprising an asymmetrically biaxially oriented, heat set polymeric linear terephthalate ester base film, one surface of which has laminated thereto a nylon film ribbon backing, in which improvement said nylon film has a nylon surface to steel static coefficient of friction of less than about 0.4. The nylon film backing can be laminated to the base film by means of an adhesive such as a polyurethane adhesive.

Ink carrying ribbons can be prepared according to the improvement of this invention which perform consistently without binding or stalling up to about 500,000 lines or more. Print quality is generally equivalent to the high print quality ribbons made of less durable film bases, but ribbon durability approaches the highest quality 3 mil nylon cloth ribbons, i.e., up to about 50 overwrites, or 750,000 lines on a 90 ft. (27.4 meter) ribbon.

BRIEF DESCRIPTION OF THE DRAWINGS

The drawing shows a cross-sectional view, greatly enlarged, of the improved ribbon of the present invention.

DETAILED DESCRIPTION OF THE INVENTION

An ink carrying ribbon of an asymmetrically biaxially oriented, heat set polymeric linear terephthalate ester base film can be improved in accordance with this invention by laminating a nylon film backing having a nylon surface to steel static coefficient of friction of about 0.4 or less to one surface thereof by means of any suitable adhesive. Expressible ink of any preferred quality can be applied by any known process to the other surface of the base film. The nylon film backing is arranged to cushion the impact of the type characters against the ribbon during printing.

Referring now to the drawing, there is shown a greatly enlarged cross-sectional view of the improved ribbon 10 of this invention. A base film 11 of about 12 to 36 μm in thickness has laminated to one surface a nylon film backing 12 by means of an adhesive 13. The nylon film can range in thickness from about 12 to 25 μm. The other surface of the base film receives a substantially uniform and continuous coating of an expressible ink 14.

In a preferred embodiment the base film 11 is a 92 gage (23 μm) asymmetrically biaxially oriented, heat set polyethylene terephthalate film. As disclosed in Whinfield and Dickson, U.S. Pat. No. 2,465,319, polyethylene terephthalate can be prepared by the condensation of ethylene glycol and terephthalic acid or by an esterification reaction between ethylene glycol and an ester forming derivative of terephthalic acid, such as a dialkyl terephthalate, e.g. dimethyl terephthalate, and polymerizing the monomeric reaction product. Films of such materials can be formed by extruding the molten amorphous polymer through a narrow orifice. Asymmetrical biaxial orientation of the polyethylene terephthalate base film can be accomplished according to the process disclosed in Alles, U.S. Pat. No. 3,165,499, incorporated herein by reference. There results a substantially improved film having excellent physical properties such as high unidirectional tensile strength, low elongation in the longitudinal direction at break and good dimensional stability.

The nylon film backing 12 is preferably a 60 gage (15 μm) nylon 6/6 film. The term nylon 6/6 means a polyamide containing units corresponding to hexamethylenedamine and adipic acid. A process for forming the nylon film by extruding molten synthetic polymer thereof onto a smooth, moving support, such as a casting chill roll, through a slot orifice is disclosed in Foster, U.S. Pat. No. 2,212,770, incorporated herein by reference. Ordinarily, the molten polymer, which has a relative viscosity of about 42 and a temperature of about 280° C. is extruded onto the chill roll surface, which is maintained at a temperature of about 82° C. Uniform width and thickness of the film is normally obtained using either air knife pinning as disclosed in Heller, U.S. Pat. No. 3,121,915 or pinning with localized jets of inert gas as disclosed in Chren et. al., U.S. Pat. No. 2,736,066, upon the top surface of the freshly melt-extruded film, the teachings of which patents are incorporated herein by reference.

Adhesive 13 is preferably a polyurethane adhesive applied to a substantially uniform and continuous thickness of about 2 pounds/ream (3 grams/square meter). The lamination process includes a two-ply nip roll laminator with an inline adhesive coating station and drying tunnel. The polyester film base receives the polyurethane adhesive from a toluene solution, is dried at about 80°–100° C. and nip roll laminated to the nylon film backing using a steel roll temperature of about 140° C. and a pressure of about 2 pounds/linear inch (0.36 kilograms/linear centimeter) on the rubber backup roll. Storage of the laminate at room temperature for about 18–24 hours allows the adhesive to cure.

A suitable polyurethane adhesive is "Uniflex" T adhesive sold by Polymer Industries. Other satisfactory adhesives include Morton 76C/301-350 polyurethane adhesive and Du Pont 46960 polyester adhesive with 2.5% RC-805 isocyanate curing agent.

In using ribbons made by laminating a nylon film backing to an asymmetrically biaxially oriented base film to form a ribbon suitable for computer printer service, it was recognized that ordinary as-cast nylon films, particularly high clarity films having haze values in the range of about 0.5 to 1.5%, showed relatively high friction which caused excessive tension during printer operation and resulted in ribbon seizures and premature failures long before normal ink exhaustion. It was discovered that the low crystallinity level of the nylon film, which is consistent with low haze and high clarity, has a slightly tacky film surface and a great tendency to drag on the ribbon guide surfaces. Nylon surface to steel static coefficient of friction measurements on the ribbons that seized during printer operation gave values in the range of about 0.55 to 1.1.

By increasing the temperature of the nylon film casting chill roll from about 82° C. to about 107° C. and decreasing air flow to the air knife pinner by about 25%, it is possible to produce a substantially improved nylon film backing having a nylon surface to steel static coefficient of friction in the range of about 0.31 to 0.35 with a haze value of about 4 to 8%. This type of as-cast nylon film backing showed almost no tendency to bind or drag during printer operation. Moreover, a suitable nylon film backing for polyester film base computer ribbons can be produced having improved anti-friction characteristics without the addition of surface effect modifiers such as diatomaceous earth, kaolinite or other known fillers.

Nylon surface to steel static coefficient of friction was measured using a capstan friction tester wherein an appropriate film sample is wrapped around a cylinder which rotates at about 0.1 centimeters/second. A second sample, 0.5 inch (1.27 cm) in width, is draped over the cylinder, one end connected to a spring (approximately 20 turns, 0.25 inch O.D., 0.020 inch dia. wire) and then to a strain gage, preferably a Statham Transducer, Model Gl-80-350. The other end of the film sample, having a 50 gram weight attached, hangs freely. The tension level of the film sample is read just prior to slip from a Sanborn Model 151 Recorder with the aid of a Sanborn Model 150-1100 Carrier Preamplifier and a Sanborn Model 150-400 power supply. Static coefficient of friction ($\mu$) of the film sample is obtained from strain gage calibration data.

Film base ribbon suitable for high speed computer printer service improved in accordance with this invention can be produced which exhibit print quality equivalent to less durable film base ribbons and a durability which approaches the best quality 3 mil nylon cloth ribbon.

What is claimed is:

1. In a composite film base ribbon suitable for use as an ink carrying ribbon in a printing machine comprising an asymmetrically biaxially oriented, heat set polyethylene terephthalate base film having a thickness in the range of about 12 to 36 microns, one surface of which has laminated thereto, by means of an adhesive, a nylon 6/6 free from surface effect modifiers film ribbon backing having a thickness of from about 12 to 25 microns, the improvement in which said nylon film has a nylon surface to steel static coefficient of friction of less than about 0.4 as measured using a capstan friction tester and a haze value of about 4 to 8%.

* * * * *